United States Patent
Cheng et al.

[11] Patent Number: 5,481,402
[45] Date of Patent: Jan. 2, 1996

[54] TUNABLE OPTICAL FILTER

[75] Inventors: Yihao Cheng, Kanata; Timothy P. Cutts, Ottawa; Gary S. Duck, Nepean; Carey M. Garrett, Kanata, all of Canada

[73] Assignee: JDS Fitel Inc., Nepean, Canada

[21] Appl. No.: 199,793

[22] Filed: Feb. 22, 1994

[51] Int. Cl.[6] ............................. G02B 5/28; G02B 5/30; G02F 1/21

[52] U.S. Cl. ..................... 359/498; 359/500; 359/578; 385/11

[58] Field of Search ........................... 359/496, 497, 359/498, 499, 500, 577, 578, 583, 584, 483, 484; 385/11

[56] References Cited

U.S. PATENT DOCUMENTS

| | | | |
|---|---|---|---|
| 3,401,590 | 9/1968 | Massey | 359/496 |
| 4,305,046 | 12/1981 | LeFloch et al. | 359/497 |
| 4,502,762 | 3/1985 | Anderson | 359/498 |
| 5,272,560 | 12/1993 | Baney et al. | 359/484 |
| 5,287,214 | 2/1994 | Robertson et al. | 359/578 |

OTHER PUBLICATIONS

R. H. Eather and D. L. Reason et al, Applied Optics vol. 8, No. 2, Feb. 2, 1969, pp. 228–234.

*Primary Examiner*—Martin Lerner
*Attorney, Agent, or Firm*—Thomas Adams

[57] ABSTRACT

An tunable optical filter of the kind used, for example, in wavelength-division multiplexing (WDM) optical communication systems and tunable source applications, has an interference filter element which is pivotable to adjust the operating wavelength of the filter. In order to reduce polarization dependency as the angle of the interference filter element changes, the light beam to be filtered is passed through the filter element twice, the second time with its polarization state shifted, specifically orthogonal, relative to the polarization state during the first pass. As a result, polarization dependent effects are equalized. The optical filter comprises a pivotally mounted filter element, an input optical fiber for directing a light beam to be filtered through the filter element in a first direction with a first polarization state, optical elements for rotating the polarization state of the filtered light beam and returning the light beam through the filter element (10) a second time, and an output optical fiber for receiving the light beam following passage of the light beam though the filter element the second time. The optical elements may comprise a reflector for reflecting a light beam emerging from the optical filter element to return through the optical filter element in the opposite direction, and a polarization rotator, such as a quarter-wave plate or a Faraday rotator, for rotating the polarization state of the light beam through 90 degrees before passage in the opposite direction.

3 Claims, 2 Drawing Sheets

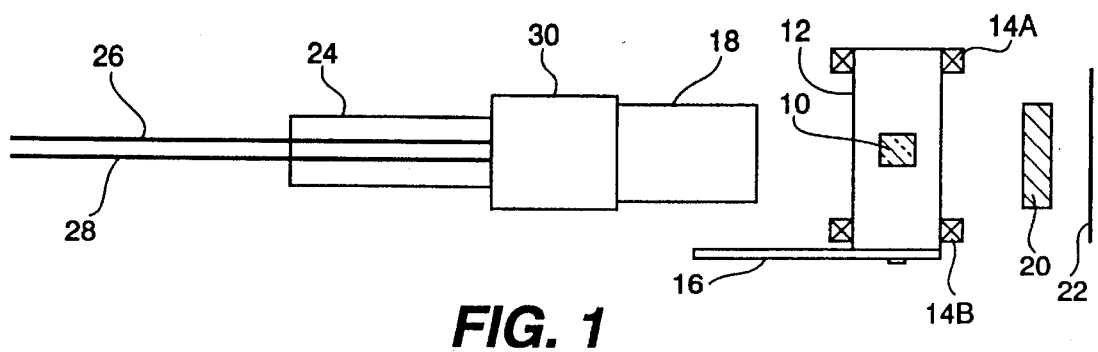
FIG. 1
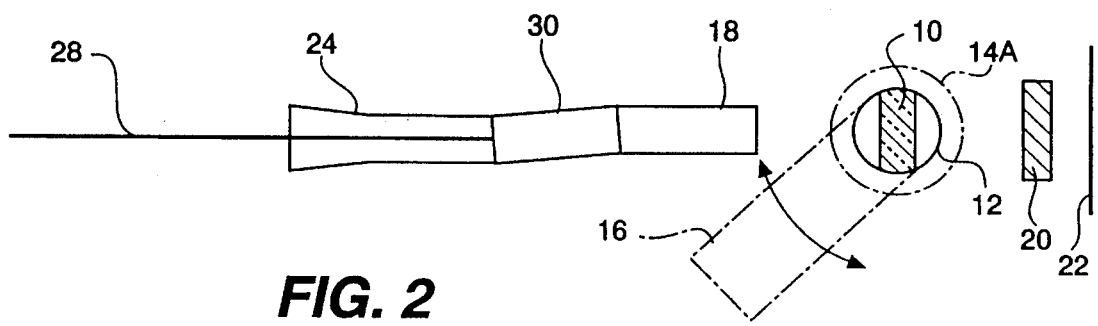
FIG. 2
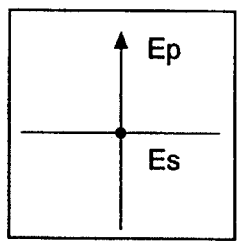 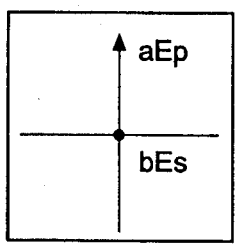 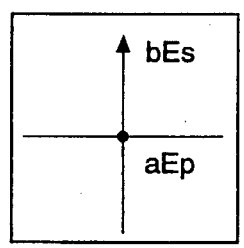 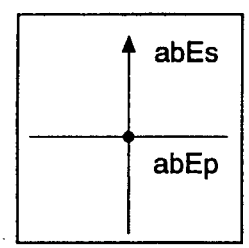
FIG. 3A     FIG. 3B     FIG. 3C     FIG. 3D

TUNABLE OPTICAL FILTER

BACKGROUND OF THE INVENTION

1. Technical Field

The invention relates to tunable optical filters and, in particular, to optical filters which can be tuned by angular adjustment of a pivoting filter element.

2. Background

Tunable optical filters are used in, for example, wavelength-division multiplexing (WDM) optical communication system and tunable source applications. In one known tunable optical filter wavelength tuning is obtained by the rotating an interference filter in a collimated beam. In the 1550 nanometers wavelength region, 20 degree rotation of the filter typically shifts the passband wavelength by 40 nanometers. While such tunable optical filters feature simple design and stable operation, a disadvantage is that, as described by R. H. Eather et al. in Applied Optics, Vol. 8, No. 2, 1969, as incidence angle is increased, the passband of the filter shows polarization dependence, and the transmittance of the filter becomes polarization dependent. This occurs because the successive transmission and reflection between the layers of the interference filter element results in different losses for light beam components having different polarization.

SUMMARY OF THE INVENTION

An object of the present invention is to obviate or at least mitigate this problem. To this end, it is proposed to configure a tunable optical filter of the kind having a pivotable filter element so that the light beam to be filtered passes though the pivotable filter element twice, the second time with its polarization state shifted so that polarization dependent effects tend to equalize.

According to the present invention, an optical filter comprises a pivotally mounted filter element, input means for directing a light beam to be filtered through the filter element in a first direction with a first polarization state, means for changing the polarization state of the filtered light beam and returning the light beam through the filter element a second time, and output means for receiving the light beam following passage of the light beam though the filter element the second time.

Preferably, the polarization state during the second pass through the filter element is orthogonal to the polarization state during the first pass.

The rotating and returning means may comprise a reflecting element for reflecting a light beam emerging from the optical filter element to return through the optical filter element in the opposite direction, and means for changing polarization state of the light beam before passage in the opposite direction.

The polarization changing means may comprise a quarter-wave plate or the like disposed between the optical filter element and the reflecting element.

Alternatively, the rotating and returning means may comprise a Faraday rotator having its optical rotation element disposed between the optical filter element and the reflecting element. The reflecting element may then comprise a reflective coating on the surface of the Faraday rotation element. An operating magnet of the Faraday rotator may be positioned adjacent the coated surface.

Various objects, features aspects and advantages of the present invention will become more apparent from the following detailed description, in conjunction with the accompanying drawings, of a preferred embodiments of the invention.

BRIEF DESCRIPTION OF DRAWINGS

FIG. 1 is a schematic plan view of an optical filter embodying the invention;

FIG. 2 is a schematic side view of the optical filter of FIG. 1;

FIGS. 3A, 3B, 3C and 3D illustrate components of a light beam passing through the filter;

DESCRIPTION OF THE PREFERRED EMBODIMENT(S)

Figure 4:
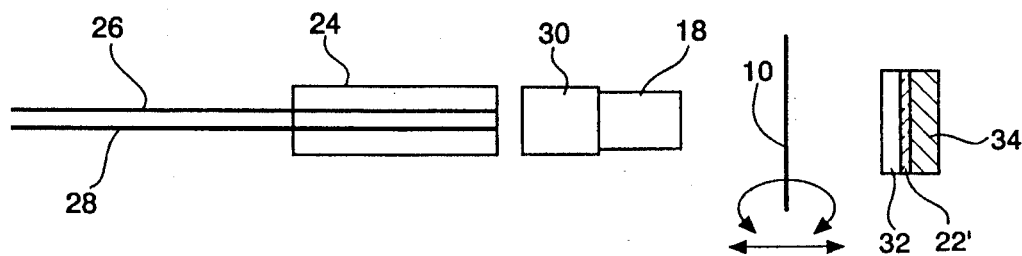
FIG. 4 is a schematic plan view of a second embodiment of the invention.

In the different Figures, corresponding components have the same reference numbers, where appropriate with a prime or suffix added.

Referring first to FIGS. 1 and 2, a first optical filter embodying the invention comprises a dielectric multilayer interference filter element 10 mounted in a hollow cylindrical support 12 which is rotatably supported at its opposite ends by bearings 14A and 14B (FIG. 1). An adjustment arm 16 attached to one end of the support 12 enables the support 12 to be rotated about its cylindrical axis Z—Z. The filter element 10 is centered in the support so that, as the support rotates, the filter element 10 pivots about axis Z—Z. The filter element 10 is positioned between an input lens 18 and a quarter-wave plate 20. The lens 18 is a grinrod focusing/collimating lens such as is marketed under the trade marks SELFOC. The quarter-wave plate 20 produces 90 degrees of phase shift between its fast and slow axes which are arranged at 45 degrees to the pivot axis Z—Z. A mirror 22 extends across the face of waveplate 20 furthest from filter element 10. A fiber tube 24 supports respective end portions of input optical fiber 26 and output fiber 28, both of which comprise single mode optical fibers. The end portions of the optical fibers 26 and 28 are spaced apart in a direction parallel to the rotation axis Z—Z to allow for displacement of the reflected light beam by the quarter-wave plate 20. A glass spacer 30 spaces the ends of the fiber 26 and 28 from the lens 18. The glass spacer 30 has the same optical path length as the space between the lens 18 and the mirror 22, thus ensuring that the returning light beam will refocus onto the end of the output optical fiber 28. The glass spacer 30 is shown tilted in FIG. 2 since the abutting face of lens 18 is inclined about 6 degrees to the perpendicular to reduce reflections.

The way in which the optical filter of the present invention deals with this effect is illustrated in FIG. 3A, in which the input light beam is expressed using two orthogonal polarized components p and s. The polarization plane of the s component is parallel to the rotation axis Z—Z of the filter and that of the p component is perpendicular to the rotation axis Z—Z. The common plane of the p and s components is perpendicular to the light transmission direction.

In use, a light beam from input optical fiber 26 passes through glass spacer 30, is collimated by the lens 18 and launched into the interference filter element 10. Upon leaving the filter element 10, the filtered light beam passes through the quarter-wave plate 20 which changes its polarization state before it reaches mirror 22. More particularly, the p and s components become circular. Following reflection by mirror 22, the reflected light beam passes through the quarter-wave plate 20 again so that, when the reflected light beam arrives at the interference filter element 10 again, its p and s components are interchanged. Having passed through the filter element 10 in the reverse direction, the reflected light beam is focused by lens 18 and coupled, via glass spacer 30, into output fiber 28.

In order to change the passband of the optical filter, the interference filter dement 10 is tilted about pivot axis Z—Z by rotating adjustment arm 16. The multilayer construction of the filter element 10 uses successive transmission and reflection of the light beam passing though it. Consequently, as the angular position of the filter element 10 changes, the filter element 10 exhibits different passbands for the orthogonal polarization components.

Referring also to FIGS. 3B, 3C and 3D, assuming the total input power is $P(=Es^2+Ep^2)$ where Ep and Es are electrical magnitudes of the p and s components, respectively, then after passing the filter the total power becomes $PC=(mEp)^2+(nEs)^2$ where m and n are transmittance of the filter for p and s components, respectively. Increasing the tilting angle results in a larger difference between tn and n, so that the total power becomes polarization dependent. FIG. 3B shows that, having passed through the filter element 10 once, the light beam is launched into the quarter-wave plate 20 and, since the fast and slow axes of the quarter-wave plate 20 are arranged at 45 degrees to the p and s components, after reflection by the mirror 22 and rotation by the quarter-wave plate 20 again, the p and s components are transposed as shown in FIG. 3C. The light is passed through the same filter element 10 again so that, on arrival at the lens 18 again, as illustrated in FIG. 3D the total power coupled to the output fiber becomes $Pd= (abEs)^2+(abEp)^2=(ab)^2P$ which is independent to Es and Ep resulting in a polarization independent operation.

Thus because the reflected light beam has its polarization state rotated through 90 degrees (or reversed if circular polarization is considered) polarization dependent loss imparted the first time the light beam passes through the filter means 10 will be compensated by polarization dependent loss imparted the second time.

In a practical trial, using a filter element 10 with single pass insertion loss of 0.6 decibels and bandwidth of 2.0 nanometers, the "double pass" loss and bandwidth were 1.2 decibels and 1.3 nanometers, respectively, with the filter element 10 perpendicular to the optical axis of the optical filter and 1.7 decibels and 1.3 nanometers, respectively, with the filter element 10 rotated through 15 degrees. A polarization dependent loss change of less than 0.1 decibels was obtained at the 15 degree position. By way of comparison, the same filter element 10 used in a conventional configuration gave a polarization dependent loss change of about 1.9 decibels.

While the use of a quarter-wave plate 20 to change the polarization state has advantages of simple configuration and potentially low cost, it should be appreciated that other optical elements could be substituted. For example, a Faraday rotator could be substituted, as illustrated in FIG. 4.

The optical filter illustrated in FIG. 4 resembles that of FIGS. 1 and 2 in that it comprises an interference filter element 10, glass spacer 30, collimating lens 18, fiber tube 24, input optical fiber 26 and output optical fiber 28. Instead of a quarter-wave plate 20, however, a Faraday rotator element 32 is positioned adjacent the filter element 10. The mirror 22' is formed as a coating on the surface of the Faraday rotator element 32 furthest from the filter element 10. An operating magnet 34 of the Faraday rotator abuts the mirror coating 22.

In both embodiments, the fiber tube 24 is carefully aligned so as to have the same angle relative to the filter 10 for both passes, thereby avoiding the transmitted and reflected light beams having different transmission peaks, which could result in differing polarization dependence and hence reduced compensation.

Figure 5:
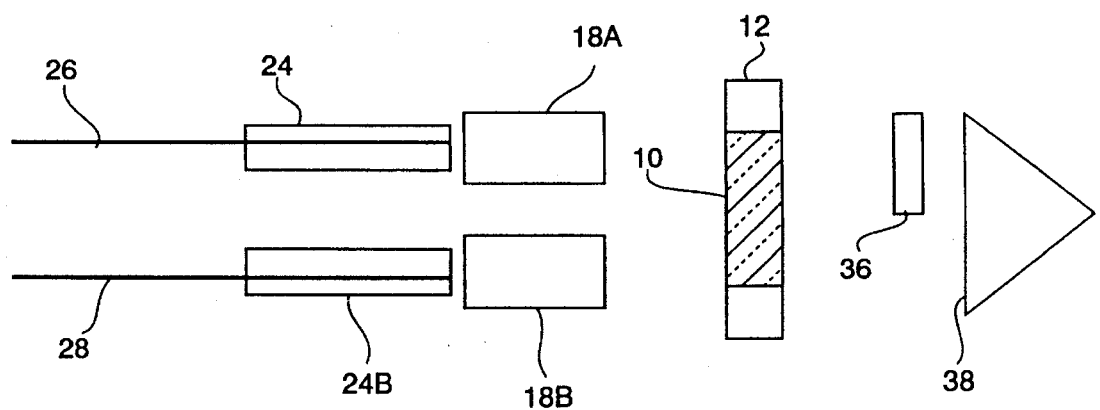
FIG. 5 is a schematic plan view of a third embodiment of the invention.

It is envisaged that other component configurations could be used to achieve the required change of polarization. Such an alternative embodiment is shown in FIG. 5, which shows an input optical fiber 26 and an output optical fiber 28 located by respective fiber tubes 24A and 24B. A first lens 18A collimates a light beam from input fiber 26 and launches it into filter element 10. After leaving the filter element 10, the filtered light beam passes through a halfwave plate or Faraday rotator 36 which interchanges its p and s components. On leaving the halfwave plate or Faraday rotator 36, the light beam is reflected by a prism 38 and returned through the filter element 10 again. It will be seen from FIG. 5 that the halfwave plate or Faraday rotator extends across only one half of the prism 38 so that the reflected light beam bypasses the halfwave plate or Faraday rotator 36. After leaving the filter element 10 in the reverse direction, the reflected light beam is coupled by lens 18B into the output optical fiber 28.

Although embodiments of the invention have been described and illustrated in detail, it is to be clearly understood that the same are by way of illustration and example only and are not to be taken by way of the limitation, the spirit and scope of the present invention being limited only by the appended claims.

What is claimed is:

1. An optical filter comprising a filter element mounted in an optical path for pivoting about a pivot axis extending transversely to said path, a quarter-wave plate mounted in the optical path and having mutually orthogonal fast and slow axes extending obliquely to the pivot axis, input means for directing a light beam to be filtered through the filter element in a first direction with a first polarization state, returning means for returning the light beam through the filter element a second time in an opposite direction, and output means for receiving the light beam following passage of the light beam through the filter element the second time.

2. An optical filter as claimed in claim 1, wherein the returning means comprises a reflecting element for reflecting a light beaten emerging from the optical filter clement in said first direction to return through the optical filter element in said opposite direction, the quarter-wave plate being disposed between tile filter element and the reflecting element.

3. An optical filter as claimed in claim 1, wherein the input means and output means are adjacent each other and mutually spaced in a direction parallel to said pivot axis.

* * * * *